Aug. 9, 1927.
E. ROUČKA
1,638,103
SYSTEM FOR TRANSMITTING OR MEASURING VARIABLE CONDITIONS
Filed Feb. 6, 1923        2 Sheets-Sheet 1
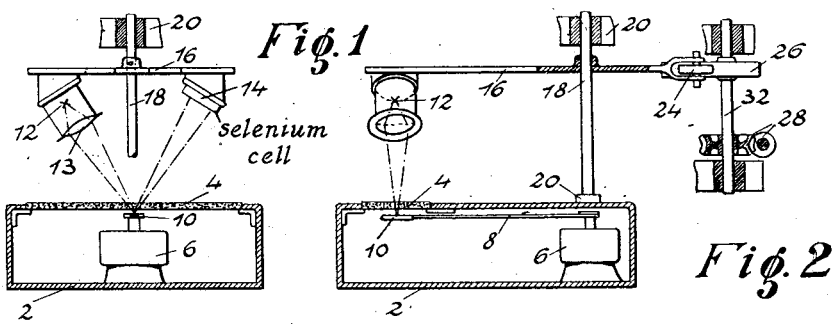
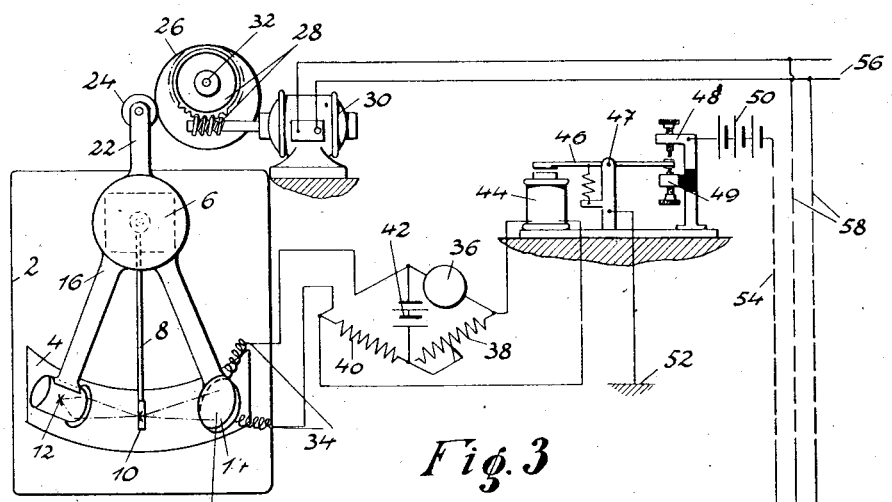
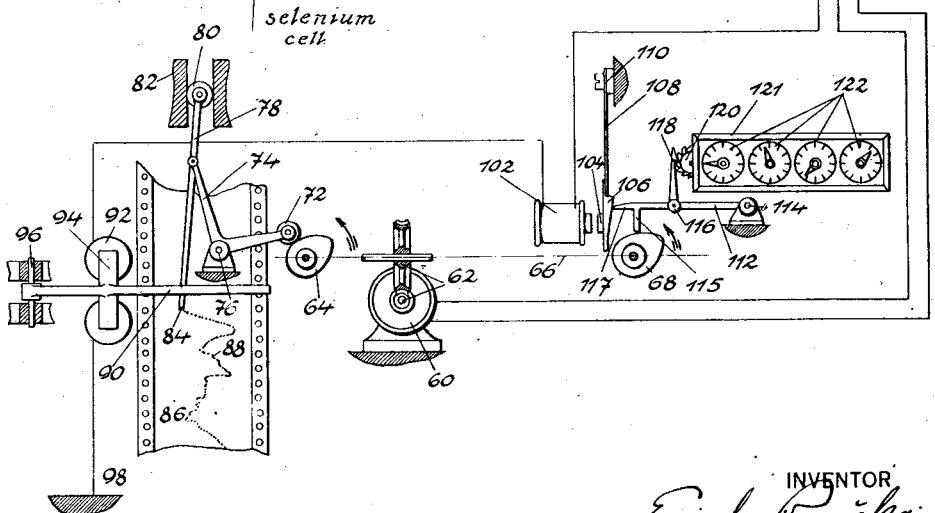
INVENTOR
Erich Roučka,
BY
Everett M. Cook,
ATTORNEYS

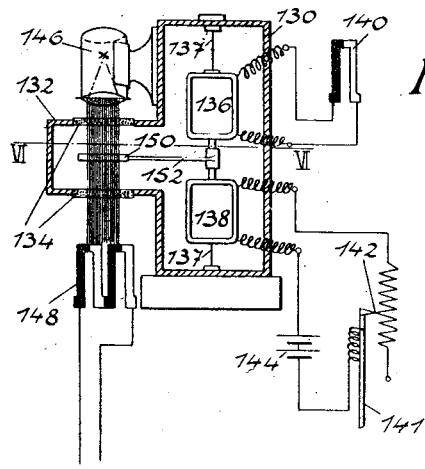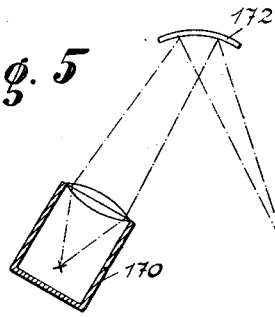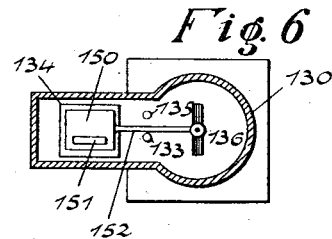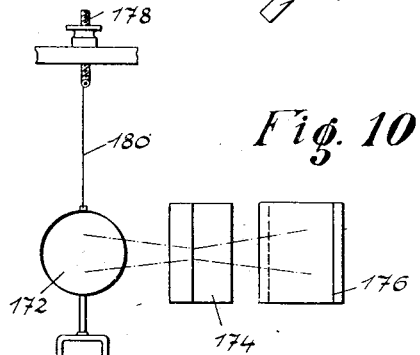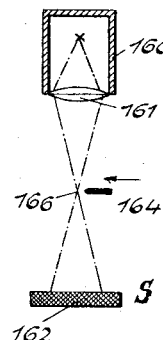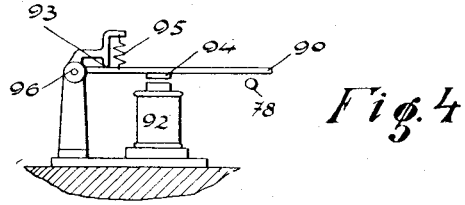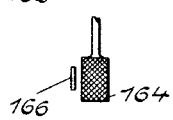

Patented Aug. 9, 1927.

1,638,103

UNITED STATES PATENT OFFICE.

ERICH ROUČKA, OF BLANSKO, CZECHOSLOVAKIA.

SYSTEM FOR TRANSMITTING OR MEASURING VARIABLE CONDITIONS.

Application filed February 6, 1923, Serial No. 617,343, and in Czechoslovakia February 14, 1922.

This invention relates to a system for transmitting variations in any quantity, quality or condition for measuring the same, or for controlling or other desired purposes. In such systems variations in a quantity, quality or condition are transmitted during regular intervals of time by means of auxiliary energy, impulses or sudden changes of which are controlled by the variations in the condition, and the relation or the time position of said impulses in corresponding intervals are functions of the condition and a measure therefor. Means actuated by said variations in the condition is provided for cooperation with means actuated by or for producing a regularly variable auxiliary quantity and the said impulses of auxiliary energy are produced when a certain relation between influence of said variations and said auxiliary quantity upon the respective means is reached. The said impulses may be transmitted to a receiving apparatus for measuring the condition, or for controlling purposes.

The object of the present invention is to provide a system of the character described in which a ray energy, for instance, light, heat, electric, sound, etc., is utilized for producing the said impulses of auxiliary energy.

The system embodying the invention consists in general of a ray producing device, a ray responsive device, a reflector. deflector or the like actuated in accordance with variations in the condition to be measured or transmitted and cooperating with means for regularly varying an auxiliary quantity in cycles of regular intervals of time for controlling the influence upon said responsive device by the rays from said ray producing device when a certain relation between said reflector, etc., actuated by said condition and said means for varying said auxiliary quantity is reached, and means controlled by said ray responsive device for producing an impulse or sudden change in an auxiliary energy when said certain relation between the means actuated by said condition and the means for varying said auxiliary quantity is reached.

In the accompanying drawings I have shown several forms of apparatus for utilizing a ray energy for producing variations in an auxiliary energy, but it will be understood that this is only for the purpose of illustrating the principles of the invention and that many modifications and changes can be made in the detail construction and arrangement of the apparatus without departing from the spirit or scope of the invention.

In said drawings in which the same characters of reference designate corresponding and like parts, Figure 1 is a view partially in front elevation and partially in section of one form of apparatus embodying my invention;

Figure 2 is a vertical longitudinal sectional view through the same;

Figure 3 is a diagrammatic top plan view of the apparatus shown in Figures 1 and 2 and also showing an apparatus for receiving the impulses of auxiliary energy;

Figure 4 is a side elevation of the electromagnetic mechanism for actuating the recording lever into engagement with the record strip, shown in Figure 3;

Figure 5 is a diagrammatic illustration partially in section of another form of ray energy apparatus;

Figure 6 is a horizontal sectional view taken on the line 6—6 of Figure 5;

Figure 7 is a diagrammatic illustration of another form of ray energy apparatus;

Figure 8 is a fragmentary top plan view of the deflector or shutter for intercepting the rays;

Figure 9 is a diagrammatic illustration in plan of another form of ray energy apparatus, and Figure 10 is a side elevation of the apparatus shown in Figure 9.

Referring particularly to Figures 1 to 4 inclusive of the drawings, the reference character 6 designates a device sensitive or responsive to variations in a quantity, quality or condition to be measured or transmitted, said device being arranged within a casing 2 and adapted to actuate an arm 8 carrying a reflector or mirror 10 which is oscillated beneath a glass window 4 in the top of the casing 2. The arm 8 and mirror 10 are actuated in accordance with variations in the condition to be measured.

Mounted on a shaft 18 journaled in bearings 20 substantially coaxial with the arm 8 is a lever 16, one end 22 of which carries a roller 24 which follows a cam 26 constantly revolved in cycles of regular intervals of time on a shaft 32 through suitable gearing 28 by a synchronous motor 30 connected to any suitable source of alternating current by wires 56. The other end of the lever is bifurcated or formed with two arms arranged at an angle to each other, one of said arms carrying a source of ray energy, in the present instance a source of light 12, which is adapted to project rays through a lens 13 against the mirror 10. The other of said arms carries a ray responsive device 14, which in the present instance is a selenium cell responsive to light rays. The source of light 12 and the selenium cell 14 are so arranged that when the source of light and the mirror 10 reach a certain relation to each other the rays of light are reflected by the mirror against the selenium cell.

The said cell 14 forms one arm of a Wheatstone bridge which is balanced or compensated by a suitable cell 36 arranged in the opposite arm. The other two arms of the bridge consist of a constant resistance 40 and a variable resistance 38, and a source of electric current 42 is connected across the arms. When the cell 14 is not influenced by light rays, the Wheatstone bridge is balanced, but when rays from the source 12 are reflected by the mirror 10 to the cell 14, the balance of the Wheatstone bridge is disturbed.

An electro-magnet 44 is connected to opposite terminals of the Wheatstone bridge and is adapted to cooperate with one end of an armature lever 46 pivotally connected intermediate its ends as at 47. The other end of said armature lever cooperates with screws 48 and 49, one of which is connected to one terminal of a source of auxiliary electric energy 50, the other terminal of which is connected through a wire 54 and a receiving apparatus to the ground as at 98. The armature lever 46 is connected to the ground as at 52.

In the operation of the system so far described, the position of the mirror 10 varies in accordance with variations of the condition being measured. The lever 16 is constantly oscillated in cycles of regular intervals of time by means of the cam 26 and motor 30, and at one instant during the oscillation of the lever 16, the source of light 12 assumes such a relation to the mirror 10 that the light rays are reflected by the mirror to the selenium cell. The balance of the Wheatstone bridge is thus disturbed and the electro-magnet 44 energized. The armature 46 is then actuated to close the contact 48, whereby an impulse or sudden change of the auxiliary energy from the source 50 is produced. The time position or relation of the impulse in or to an interval of time consumed by the cycle of oscillation of the lever 16, is dependent upon the then magnitude of the condition and a function and a measure of the magnitude of the condition at the moment of the impulse.

The impulses of auxiliary energy are transmitted to a suitable receiving apparatus which may be placed at a point remote from the device 6 for the purpose of measuring the condition or for controlling purposes.

The impulses of auxiliary energy from the source 50 are shown as conducted by a wire 54 to a suitable receiving apparatus. This receiving apparatus consists in the present instance of an integrating device 122 which is driven by a ratchet wheel 120 with which cooperates a pawl 118 carried by a lever 112 pivoted at one end to a fixed support as at 114. Said lever is provided with a projection 115 which follows a cam 68 driven through suitable gearing 62 from a synchronous electric motor 60 connected to the same source of current as the motor 30. The lever 112 is normally held against following the cam 68 by means of a nose portion 117 which is normally engaged by a detent shoulder 106 carried by a resilient strip 108 connected at one end to a fixed support at 110. Said resilient strip carries an armature 104 cooperating with an electro-magnet 102 connected in circuit with the source 50 of auxiliary energy and the switch mechanism 46, 88. Upon each impulse of auxiliary energy, the armature 104 is attracted by the magnet 102 and the lever 112 falls by gravity into engagement with the cam 90. This action causes a rotation of the ratchet wheel 120 by the pawl 118 so as to actuate the integrating mechanism 122. Obviously, the extent of movement of the lever 112 and rotation of the ratchet wheel 120 will be determined by the time position of the impulse of auxiliary energy in one interval of time or complete revolution of the cam 68, and this corresponds to the position of the mirror portion 10 on the arm 8 at the time of the impulse.

The variations in the condition are also shown as recorded by means of a lever 78 carrying at one end a pen 84 cooperating with a traveling record strip 86. The other end of said lever 78 carries a roller 80 arranged between two parallel guides 82. The lever 78 is pivotally connected intermediate its ends to one arm 74 of a bell crank lever, and said bell crank lever is pivotally connected at 76 to a fixed support and is provided on its other arm with a roller 72 following a cam 64 also driven by the synchronous motor 60. The lever 78 is thus constantly oscillated transversely of the record strip 86 in cycles of regular intervals of time corresponding to the oscillation of the lever 16.

The pen 84 is normally spaced from the strip 86, and for the purpose of momentarily forcing the pen into contact with the record strip upon each impulse of auxiliary energy, I have shown electro-magnets 92 connected in circuit with the source 50 of auxiliary energy and cooperating with an armature 94 carried by a lever 90 pivotally mounted at one end to a fixed support as at 96 and overlying the lever 78. Upon each impulse of auxiliary energy the magnets 92 are energized and attract the armature 94 so as to force the lever 90 into engagement with the lever 78 and thereby move the pen 84 into contact with the record strip 86 to produce a dot. The record thus consists of a curve 88 formed of a plurality of spaced dots each of which represents the magnitude of the condition at the moment of the impulse. It will be observed that there is no reaction on the sensitive device 6 as the result of the production of the impulses or sudden changes of auxiliary energy.

In Figure 5 I have shown a heat ray energy system. This system is shown as comprising a casing 130 in which is mounted a coil 136 sensitive to variations in the current set up in a thermo-electric cell 140 by variations in the condition which in the present instance is temperature. This system may be of any desired type, for instance the Depres d'Arsonval. The coil 136 is shown as supported in the casing by a flexible member 137 and has rigidly connected thereto a similar coil 138 also connected to the casing by a flexible member 137. This coil 138 is sensitive to a regularly variable auxiliary quantity, which in the present instance is a variable electric current from a source 144 produced by a variable resistor including a contact member 142 which may be actuated over the resistor by any suitable means, for instance, similar to the motor 30 and cam 26 shown in Figure 3.

The coils 136 and 138 have rigidly connected thereto an arm 152 movable between fixed stops 133 and 135 and carrying a diaphragm 150 having an opening 151 therein. This diaphragm 150 is normally interposed between a source of heat energy 146 which directs rays through windows 134 in the casing 130 against a thermo-battery 148. While the temperature affecting the thermo-electric cell 140 is unbalanced by the regularly variable current from the source 144, the diaphragm 150 intercepts the heat rays from the source 146 and prevents them from reaching the thermo-battery 148. At the moment of compensation or balance between the influence of the temperature on the cell 140 and the coil 136 and the influence of the current from the source 144 upon the coil 138, the diaphragm 150 is swung by the coils 136 and 138 against the fixed stop 135, and during this movement the heat rays pass through the slot 152 in the diaphragm against the thermo-battery 148 which is thus influenced. The thermo-battery 148 may be connected to a relay for producing the sudden changes of auxiliary energy, similarly to the cell 14, shown in Figures 1 to 3, inclusive.

The sudden changes or impulses of auxiliary energy may also be produced by interception or cutting off of the ray energies from the sensitive device instead of directing the rays to the sensitive device as shown in Figures 1 to 6, inclusive. Such a construction is shown in Figure 7 in which the light rays 166 from a source 160 are normally projected through a lens 161 to a ray responsive or sensitive device 162. At the moment of compensation or balance between the quantity or quality and the regularly variable auxiliary quantity, a shutter 164 is swung into the path of the rays 166 so as to intercept or cut them off from the device 162. The device 162 may be connected in the system similarly to the cell 14 or thermo-battery 148, and the operation of the system would be substantially the same as those shown in Figures 1 to 3, inclusive.

In Figures 9 and 10 I have shown a system including a mirror 172 which is rigidly connected to a device 186 corresponding to devices 136 and 138 in Figure 5 sensitive to variations in the condition to be measured and the auxiliary quantity, for instance a differential galvanometer, said mirror and device 186 being supported from an adjusting screw 178 and a resilient support 184 by flexible members 180 and 182. A source of ray energy 170 is so arranged as to direct its rays against the mirror 172, and the said mirror reflects said rays against a responsive device 176. A refracting prism 174 is arranged in the path of the rays between the mirror 172 and the device 176, the purpose of the prism being to produce a sudden diffusion of the light ray over a large area of the surface of the cell 176 upon a slight deflection of the mirror 172. The mirror 172 is rotated by the device 186 when the certain relation between the influences of the electric currents thereon is reached, the moment of which is determined by the magnitude of the condition.

It will be understood that the systems shown in Figures 5 to 10, inclusive, may be connected to any suitable receiving apparatus, for instance, that shown in Figure 3.

The present application is based particularly upon the transmitting apparatus, a system embodying the general combination of transmitting apparatus and receiving apparatus being described and claimed in applicant's copending application, Serial No. 625,153, filed March 14, 1923. Systems of this general type including both transmitting and receiving apparatus are also disclosed in United States Patents Nos. 1,412,586 dated April 11, 1922 and 1,434,064 dated October 31, 1922. The receiving apparatus described in the present application is common to a number of applicant's copending applications, and it is obvious that any suitable receiving apparatus may be used with the particular transmitting apparatus herein described.

Having thus described the invention, what I claim is:

1. A system for transmitting variable conditions, comprising a source of ray energy, a source of auxiliary energy, a ray energy responsive device, means affected by and in accordance with variations in a condition to be transmitted, means affected by an auxiliary quantity regularly variable in cycles of regular intervals of time, and means responsive to variations of said regularly variable means and cooperating with the means affected by the condition to be transmitted to control the influence of the ray energy on the ray energy responsive device to produce an impulse of said auxiliary energy at a point in each cycle of the movement of the regularly variable means corresponding to the then magnitude of the variable condition.

2. A system for transmitting variable conditions, comprising a source of ray energy, a source of auxiliary energy, a ray energy responsive device to control said auxiliary energy, means affected by and in accordance with variations in a condition to be transmitted, a ray energy intercepting means to be actuated by and in accordance with said condition to vary the influence of said ray energy upon said ray responsive device, means responsive to variations in said condition for actuating said intercepting means, and means affected by an auxiliary quantity regularly variable in cycles of regular intervals of time and cooperating with said ray energy intercepting means to control the influence of the ray energy on the ray energy responsive device to produce an impulse of said auxiliary energy at a point in each cycle of the movement of the regularly variable means corresponding to the then magnitude of the variable condition.

3. In a system for transmitting variable conditions, means regularly movable in a fixed path in cycles of regular intervals of time including a source of ray energy and a ray responsive device, means movable in a fixed path by and in accordance with variations in the condition to be transmitted and cooperating with the source of ray energy and the ray responsive device of said regularly movable means to control the influence of the ray energy on the ray energy responsive device in accordance with variations in said condition, a source of auxiliary energy, and means including said ray responsive device for producing an impulse of said auxiliary energy at a point in each cycle of the movement of the regularly variable means corresponding to the then magnitude of the variable condition.

ERICH ROUČKA.